United States Patent [19]
Wadin et al.

[11] Patent Number: 5,499,397
[45] Date of Patent: Mar. 12, 1996

[54] SWITCHED ANTENNA DIVERSITY ALGORITHM EMPLOYING RECEIVED SIGNAL STRENGTH, PHASE ERRORS AND RECOVERED CLOCK

[75] Inventors: Craig P. Wadin, Sunrise; Paul D. Marko, Ft. Lauderdale, both of Fla.

[73] Assignee: Motorola, Inc., Schaumburg, Ill.

[21] Appl. No.: 236,826

[22] Filed: May 2, 1994

[51] Int. Cl.$^6$ ..................................... H04B 1/16
[52] U.S. Cl. .................. 455/277.1; 455/135; 455/277.2; 375/347
[58] Field of Search ..................................... 455/133, 134, 455/135, 277.1, 277.2; 375/100, 347; 370/77

[56] References Cited

U.S. PATENT DOCUMENTS

| | | |
|---|---|---|
| 4,584,709 | 4/1986 | Kneisel et al. |
| 4,710,957 | 12/1987 | Bocci et al. |
| 5,203,023 | 4/1993 | Saito et al. ........................ 455/277.1 X |
| 5,203,024 | 4/1993 | Yamao ............................. 455/277.1 X |

FOREIGN PATENT DOCUMENTS

94/13068  6/1994  WIPO ................................. 455/277.2

OTHER PUBLICATIONS

ETSI, ETS 300 131 (prl), Jun. 1993, Second Edition, pp. 1–265.

Primary Examiner—Reinhard J. Eisenzopf
Assistant Examiner—Chi H. Pham
Attorney, Agent, or Firm—John G. Rauch; Barbara Doutre

[57] ABSTRACT

The present invention comprises a method and apparatus for selecting one of at least two antennas (202, 204) in a communication unit (200) for use in a wireless communication system (100). A signal is received by a radio frequency receiver during a receiving period from one of the at least two antennas (202, 204) currently selected by an antenna switch (206), the signal transmitted in a digital communications format comprising a plurality of bits. The quality of the receive signal is determined by a switch diversity algorithm programmed into a microcomputer (212) that bases the decision to switch antennas on predetermined thresholds established for each of: a received signal strength indicator, a phase error signal, and a recovered clock signal.

18 Claims, 7 Drawing Sheets

SWITCHED ANTENNA DIVERSITY ALGORITHM EMPLOYING RECEIVED SIGNAL STRENGTH, PHASE ERRORS AND RECOVERED CLOCK

TECHNICAL FIELD

This invention relates generally to wireless communication systems, and more specifically to a method and apparatus for performing antenna diversity in a wireless communication receiver.

BACKGROUND

Radio frequency communication receivers that support antenna diversity for overcoming some symptoms of multipath fading in a mobile environment are well known in the art. Examples of such receivers may be found in cellular mobile telephone systems. Other examples of such receivers may be found in systems such as those based on second generation cordless telephony (CT2) technology.

Some conventional radio communication receivers that support antenna diversity make the decision about which antenna should be used for receiving and transmitting a signal based upon the signal strength of the received signal. For example, whenever the received signal strength of the incoming signal falls below a predetermined level, the receiver switches to a different antenna in order to attempt to get better reception. Conventional CT2 digital communication transceivers that support antenna diversity make decisions about which antenna to use based on signal strength or checksum errors.

Unfortunately, there are drawbacks to using only received signal strength as a trigger for switching antennas. The drawback results from the effects of delay dispersion caused by selective multipath reflections of radio signals, and from interference signals. Both delay dispersion and interference signals can comprise substantial amounts of received signal strength, thus "fooling" the antenna diversity trigger mechanism which relies only on received signal strength measurements. This can cause a diversity system to remain coupled to the current antenna selection, when switching to an alternate antenna would likely produce better results.

Some other antenna diversity systems use detected checksum errors as a trigger for switching antennas to overcome the aforementioned drawback associated with received signal strength, but this introduces a new problem. The new problem results from the amount of time it can take to detect an error. For example, during user communications in the CT2 system, a forty to eighty millisecond period is required to detect a checksum error in a relatively slow signaling data stream that accompanies the user communications. The possible loss of user communications for a corresponding forty to eighty milliseconds before switching to a better antenna can be very objectionable to system users.

Thus, what is needed is a way of controlling antenna diversity that performs well even in the presence of delay dispersion and interference, and that performs quickly enough to switch antennas before a degrading signal can cause an objectionable loss of user communications.

DETAILED DESCRIPTION OF THE PREFERRED EMBODIMENT

Figure 1:
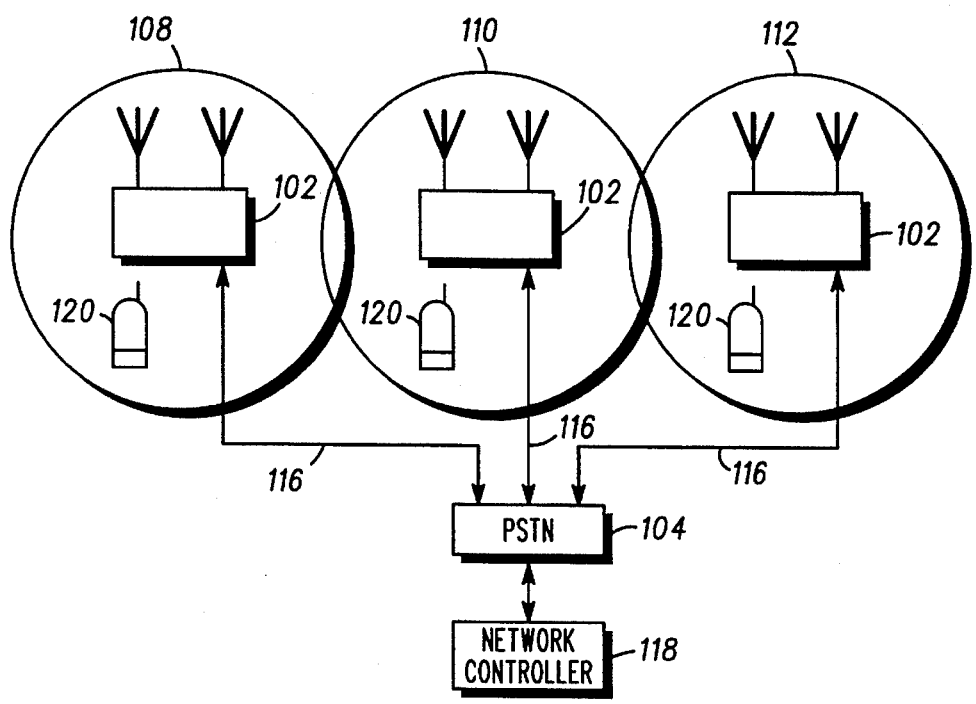
FIG. 1 is a block diagram of a communication system in accordance with the present invention.

Referring now to the drawings and specifically to FIG. 1, there is shown a block diagram of a wireless communication system such as a second generation cordless telephone system (CT2) 100 in accordance with the present invention. System 100 comprises a plurality of fixed communication units (also called point stations) 102 coupled to a telephone system 104, e.g., a private branch exchange (PBX) or a Public Switched Telephone Network (PSTN). The fixed communication units 102 provide wireless communication coverage within coverage areas 108, 110, and 112 for portable communication units 120. The coupling between the fixed communication units 102 and the telephone system 104 is performed by telephone lines 116 for transporting user communication between the portable communication units 120 and the telephone system 104. A network controller 118 is coupled to the PSTN 104 for providing system administration functions.

Call point stations 102 are also referred to as telepoints or cordless fixed parts (CFPs). CFPs allow persons using the portable telephone handsets 120 (also known as cordless portable parts, CPPs), to access the PSTN 104. Access to the PSTN 104 can occur when a CPP 120 gets in range of a telepoint (CFP) 102 and after the CPP (handset) 120 has established a synchronous link with the CFP (base station) 102.

In a CT2 system, a handset initiating a call to a base station asynchronously transmits on one available channel of the handset's transceiver, which corresponds to a radio frequency (RF) channel in the base station (each base station being capable of supporting up to 40 channels).

In a typical CT2 system, the communication protocol standard includes four main burst structures, called multiplex 3 (MUX 3), multiplex 2 (MUX 2), and multiplex 1 (MUX 1) which is further subdivided into either multiplex 1.4 or 1.2 (MUX 1.4 or MUX 1.2). MUX 3 is utilized mainly for communication link initiation (link establishment and re-establishment) for CPP to CFP. MUX 2 is used primarily for communication link establishment and for link initiation from the base station (CFP). The MUX 1 burst structures (MUX 1.2 and MUX 1.4) are used primarily for voice/data communications, signaling information, and control messages from the CPP (portable) and CFP (base).

For a better understanding of the overall CT2 system communication protocol, one is referred to a publication entitled, "Common air interface specification to be used for the inter working between cordless telephone apparatus in the frequency band 864.1 MHz to 868.1 MHz, including public access services", Version prI-ETS 300 131, June 1993, which is published by the European Telecommunications Standards Institute and is hereby incorporated by reference.

In present CT2 systems, all communications occur between the CPPs 120 and CFPs 102, with typically the CPPs initiating the calls to the CFPs, although CFPs can also initiate calls to individual CPPs. Using the CT2 protocol standard (CAI), a cordless handset (CPP) initiating a call, asynchronously transmits using MUX 3 on an available radio frequency channel to the base (CFP), while the base station scans in MUX 3 waiting for a poll by one of the CPPs in the system.

Figure 2:
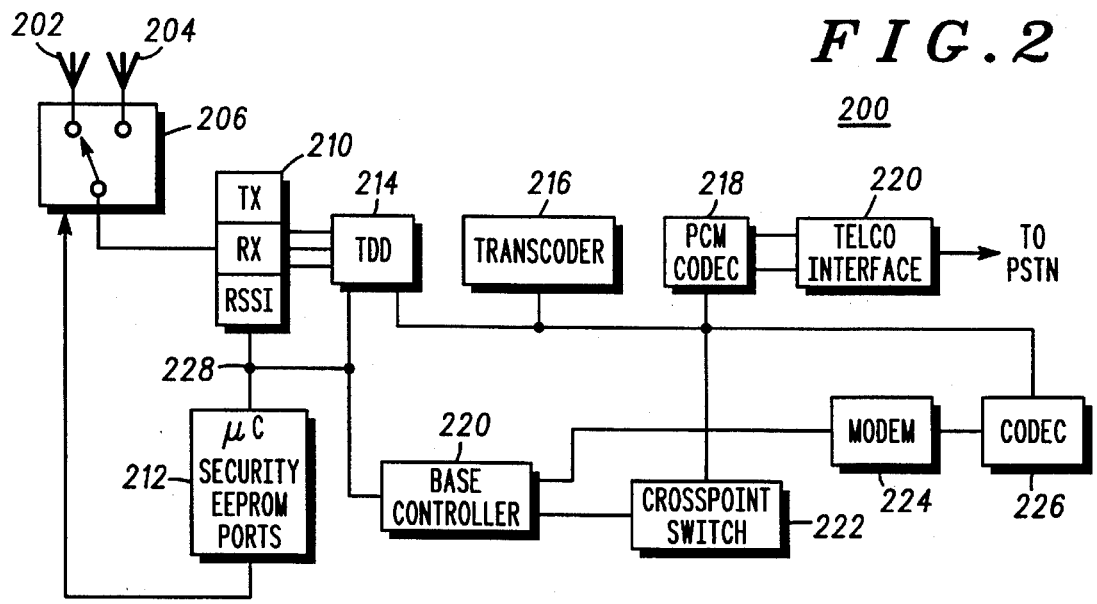
FIG. 2 is a block diagram of a communication device in accordance with the present invention.

With reference to FIG. 2, an electrical block diagram for the apparatus of fixed communication units 102 in accordance with the preferred embodiment of the present invention comprises first and second antennas 202, 204 coupled to an antenna switch 206. The first and second antennas 202, 204 preferably are sufficiently separated in space to provide reception diversity, so that the antenna switch 206 may be controlled as described herein below to select the first or second antenna intercepting the better signal at a particular instant of time. Antenna switch 206 selects between antenna 202 and 204 by a control signal sent via line 208 from a control means such as microcomputer 212. The antenna switch 206 is also coupled to a radio frequency (RF) transceiver 210 for transmitting communication signals to and receiving communication signals from the antenna switch 206. The RF transceiver 210 is also coupled to microcomputer 212 which includes a stored program for controlling RF transceiver 210.

The RF transceiver 210 is coupled to a time-division-duplex (TDD) circuit 214 for converting between TDD signaling of the RF transceiver 210 and a space-division-duplex signaling of a transcoder 216. Preferably, the TDD circuit 214 performs compatibly with the second generation cordless telephony (CT2) TDD transmit and receive intervals of one millisecond each, although other TDD transmit and receive intervals could also be used.

The transcoder 216 is coupled to the TDD circuit 214 for converting between adaptive differential pulse code modulation (ADPCM) signaling of the TDD 214 and pulse code modulation (PCM) signaling of a coder/decoder (CODEC) 218 coupled to the transcoder 216 for converting between the digital PCM signaling of the transcoder 216 and the analog signaling of a telephone company (TELCO) interface circuit 220.

The TELCO interface circuit 220 is coupled to the CODEC 218 for providing well-known telephone interface functions such as line supervision, incoming call detection, telephone address signaling, etc. Communication station 200 further comprises a base controller 220 which is in charge of controlling communications with network controller 118. Base controller 220 includes appropriate memory such as EEPROM, ROM, and RAM for storing information and control software. Base controller 220 controls crosspoint switch 222, modem 224, and codec 226 in order to interchange information between station 200 and network controller 118.

Within the microcomputer 212 resides a program for diversity control of the antennas 202 and 204. The program is based on parameters generated by the TDD 214 with reference to the received signal. The TDD 214 has incorporated into it a digital phase lock loop (DPLL) that adjusts itself based on received data transitions. The TDD DPLL circuit also provides a control line called HOLD, a change in the HOLD control logic level indicates a point in time that the TDD determines the received data output from the RF transceiver 210 is valid. The point in time that the change in logic level of the HOLD control line occurs varies as the delay in the received data changes thus providing a method of measuring the change in this delay. During the initial 256 frames of the MUX 1 link, a reference timing for the recovered clock is established by measuring the time from the falling edge of TDD sync to the rising edge of the HOLD control line. This timing relationship is controlled by the digital phase lock loop in the TDD and therefor represents the data delay as the channel characteristics change due to delay spread. A window of allowable change based on an initial delay value is specified in the diversity algorithm (to be described later) and is measured for each receive frame. Any excursion outside this window will create an indication to change from a currently selected antenna to a subsequent antenna.

During each receive frame a radio signal strength indication signal (RSSI) indication circuit provides a DC voltage level from the receiver 210 that is a representation of the relative signal strength received.

In the preferred embodiment of the invention, a recovered clock signal is generated from the DPLL circuit located within the TDD circuit 214. The recovered clock is monitored by the diversity algorithm residing in microcomputer 212 for positive or negative adjustments to indicate if a delay in channel communication has occurred. This information is used as a basis for the decision on whether to switch antennas. Basically, the purpose of this portion of the antenna diversity algorithm (as will be described), is to take a "snapshot" of where the recovered clock sits at a point in time on a frame by frame basis.

Signal quality detect registers located within the TDD 214 calculate the phase error percentage based on a data transition detector that determines the percentage of transitions occurring outside of a window centered around the recovered clock versus the total number of transitions detected. This parameter is used for muting. A mute is caused by a phase error level, a programmable threshold, which in the preferred embodiment is 20%.

Figure 3:
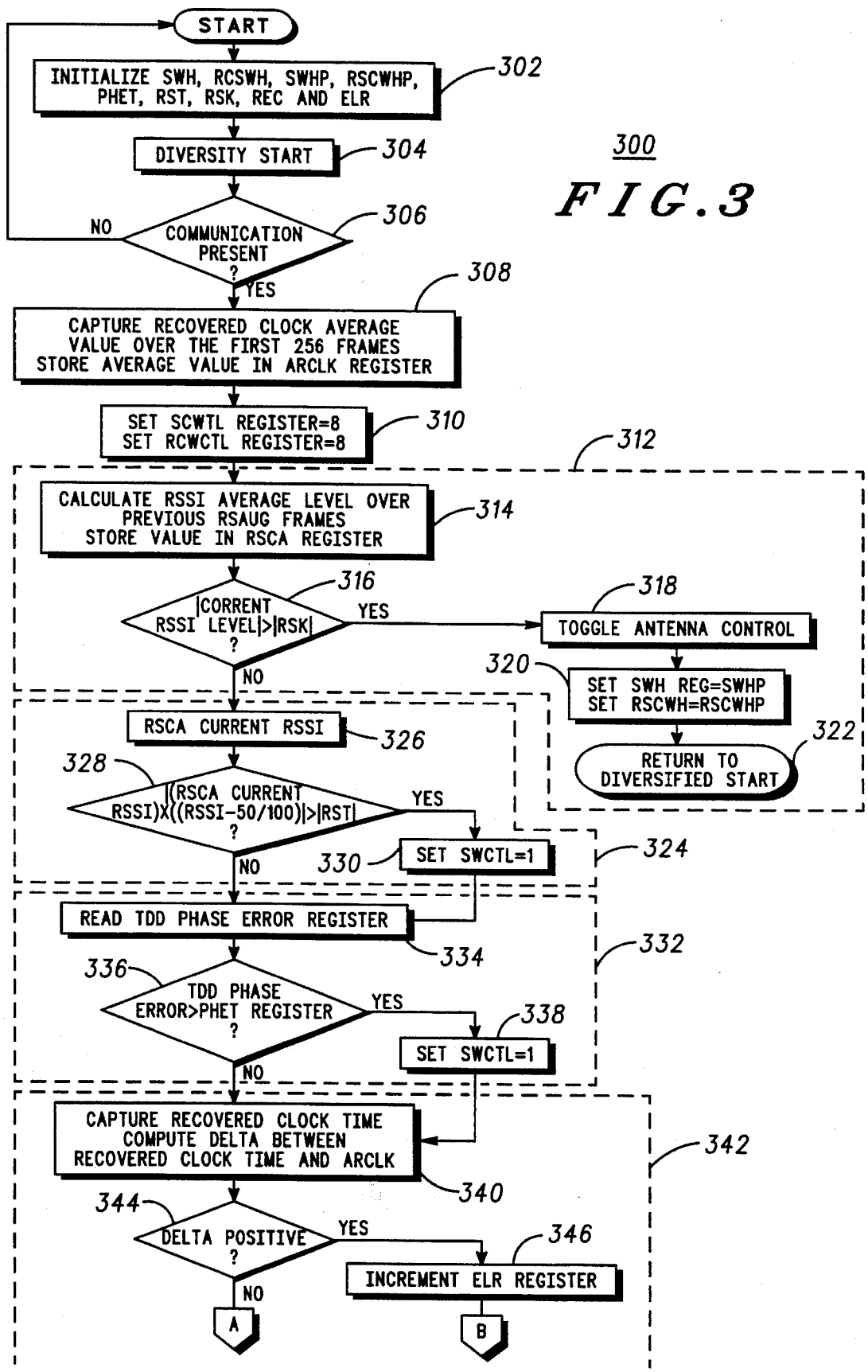
FIG. 3 is a flow chart showing a method for switching antennas in accordance with the present invention.

Referring now to FIG. 3, a flow chart providing a method for controlling antenna diversity in accordance with the present invention is shown. The three control variables used in the preferred embodiment are: recovered clock, phase error, and RSSI. These variables are stored in the memory area of microcomputer 212. A reference time for the recovered clock is established by measuring the time from the falling edge of TDD sync to the rising edge of the hold control line during the initial 256 frames of a MUX 1 link. This timing relationship is preferably controlled by the digital phase lock loop in the TDD 214 and therefore represents the data delay as the channel characteristics change due to delay spread. A window of allowable change based on this initial value is specified in the algorithm and is measured for each receive frame. Any excursion outside this window will create an indication to switch antennas.

At the end of each receive frame the TDD phase error register is read and compared to a threshold specified in the algorithm. Any excursion above this threshold creates an indication to switch antennas.

The RSSI is monitored in a first and second mode. For the first mode, the RSSI level is read and compared at the end of each receive frame to the average of the previous number of RSSI levels captured as specified in the algorithm. This result is weighted according to the actual RSSI level with a weaker signal weighted higher than a stronger one. The result (absolute value) is then compared to a parameter specified in the diversity algorithm 300. Any excursion above this threshold (absolute value) will create an indication to switch antennas. For example, the threshold for the first mode RSSI could be set to –2 and if the weighted result of the measurement produced a value of –10, the antennas would toggle.

For the second RSSI mode, the RSSI level is read (absolute value) and compared to an absolute level specified in the algorithm 300. Any excursion above this threshold creates an indication to switch antennas. For example, if the second mode threshold were set to –95 dBm, an RSSI signal level of –100 dBm would cause the antennas to toggle.

Figure 11:
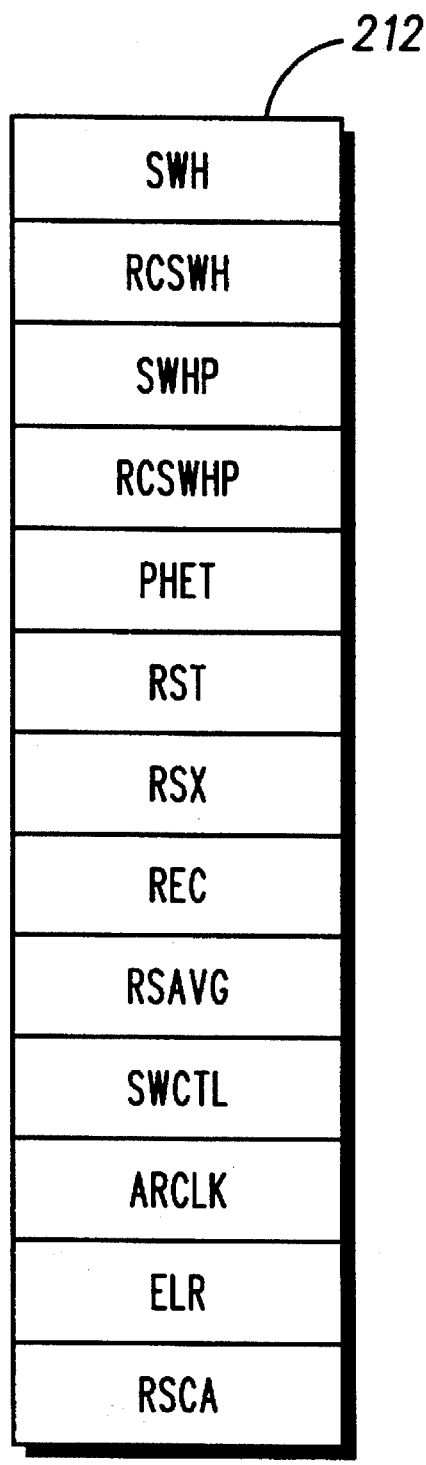
FIG. 11 is a is block diagram of storage registers in accordance with the present invention.

Variable names, abbreviations and definitions for the registers of diversity algorithm 300 in accordance with the invention are described in Table 1. These registers are located in microcomputer 212 and are shown in FIG. 11 of the accompanying drawings.

TABLE 1

| | |
|---|---|
| (SWH) | switch hysteresis register for RSSI and phase error |
| (RCSWH) | switch hysteresis register for recovered clock |
| (SWHP) | switch hysteresis preset register |
| (RCSWHP) | switch hysteresis preset register for recovered clock |
| (PHET) | phase error switch threshold register |
| (RST) | RSSI switch threshold register |
| (RSX) | RSSI lower level threshold register |
| (REC) | recovered clock change threshold register |
| (RSAVG) | number of frames for RSSI averaging register |
| (SWCTL) | switch control register for phase error and RSSI |
| (ARCLK) | register for storing average recovered clock value |
| (ELR) | recovered clock early late register |
| (RSCA) | register for storing average RSSI value over previous number of frames defined by RSAVG parameter register |

Step 302 of FIG. 3 initializes the SWH, RCSWH, SWHP, PHET, RST, RSX, REC, ELR, and RCSWHP registers based on an 8 bit binary format. In the preferred embodiment, the PHET register is preferably initialized to $03 ($ represents hexadecimal value) to indicate that an excursion above this value will toggle the antenna. The RST is preferably initialized to $FFFD and the RSX initialized to $FFA0. Any RSSI level above the RST threshold will cause a change in antennas, and any RSSI level below the RSX threshold will cause a change in antennas. The REC register is preferably set to $03 such that any recovered clock level above this value will cause a toggle in antennas. The ELR register is preferably initialized to $00 for monitoring the status of the recovered clock (early or late).

In the preferred embodiment, the switch hysteresis register (SWH) is preferably set to $03, this register provides a programmable limit on the switching time duration, in number of frames, between antenna switch occurrences caused by the RSSI slope and phase error steps. The RCSWH register provides a programmable limit on the switching time duration, in number of frames between antenna switch occurrences caused by the recovered current clock comparison to the ARCLK initial average calculated. The RSCWH register is initialized to $0A in the preferred embodiment. The SWHP and RCSWHP registers hold the preset values for the SWH and RCSWH registers and are used to reset the SWH and RCSWH registers to the initialized values if the antennas are toggled.

The two hysteresis registers SWH and RCSWH are responsible for guaranteeing the system will lock to a new antenna for a period of time defined by the hysteresis. The hysteresis registers control the minimum time that the at least one of the two antennas maintains its current status. In the preferred embodiment, the hysteresis level for the recovered clock hysteresis threshold is set in accordance with the bandwidth of the digital phase lock loop circuit to provide appropriate hysteresis when switch occurrence is due to channel delay.

Referring back to the flow chart 300, step 304 indicates the start of the diversity algorithm. In step 306, it is determined if communication device 200 is receiving any incoming information packets. In a CT2 system this would require that a communication link be established and that the communication device be operating in MUX 1.2 or MUX 1.4. If information packets are being received, an enable signal is sent from the TDD 214 via bus 228 to microcomputer 212. Once communication is established in step 306, the recovered clock is preferably averaged over the first 256 frames and stored in the average recovered clock register in step 308. Next, the switch control registers for phase error/ RSSI (phase error and RSSI), and recovered clock are set to 0 in step 310.

Section 312 is responsible for determining if the RSSI level has fallen below the programmable low level threshold. If the absolute RSSI level is above the absolute predetermined threshold, the antennas will toggle and the SWH and RCSWH registers will be reset to their preset values. If the absolute current RSSI value is not above the absolute threshold the code will proceed to section 324.

Referring to section 312, in step 314, the RSSI level average of the previous number of frames (RSAVG) is calculated and then stored in the RSCA register. The current RSSI level is then compared to the RSSI lower level threshold register in step 316. If the absolute RSSI level is greater than the absolute RSSI lower level threshold (RSX), then the antennas are toggled at step 318, and the switch hysteresis register for RSSI/phase error is reset to its preset value in step 320. The recovered clock hysteresis register is also reset to its preset value in step 320 and the diversity algorithm is then started over as indicated at step 322.

Section 324 is responsible for calculating the weighted RSSI slope and comparing the result to a programmable threshold. If the result exceeds the threshold it will set the SWCTL register, and if the result is below the threshold, the code will continue to section 332.

Referring to section 324, the current RSSI value is subtracted from the value stored in the RSCA register, as shown in step 326. If the result of step 326 when multiplied by ((RSSI-50)/100), absolute value, is greater than the absolute value stored in the RSSI switch threshold register, step 328, then the switch control register for RSSI/phase error is set equal to 1 in step 330.

Section 332 is responsible for determining if the phase error calculation done by the TDD signal quality detect circuitry for the previous frame has exceeded a programmable threshold. If the result exceeds the threshold, the SWCTL register is set, and if the result does not exceed the threshold the code will continue to section 342.

Referring to section 332, in step 334, the contents of the TDD phase error register are read and if found to be greater than the contents of the phase error switch threshold register (PHET), step 336, then the switch control register for RSSI/phase error is set equal to 1 in step 338. Steps 336 and 338 are responsible for determining degradation in the channel using the TDD signal quality detect circuitry.

Section 342 provides two functions. The first function is to keep count of the early and late occurrences of the recovered clock measured for the previous receive frame and the initial ARCLK average. If the number of early or late occurrences exceeds a programmable threshold, this section of code will update the ARCLK average accordingly.

The second function of section 342 is to check if the hysteresis value has become 0. If this value is not 0, the RCSWH register will be decremented by 1 count and continue to section 366.

Figure 4:
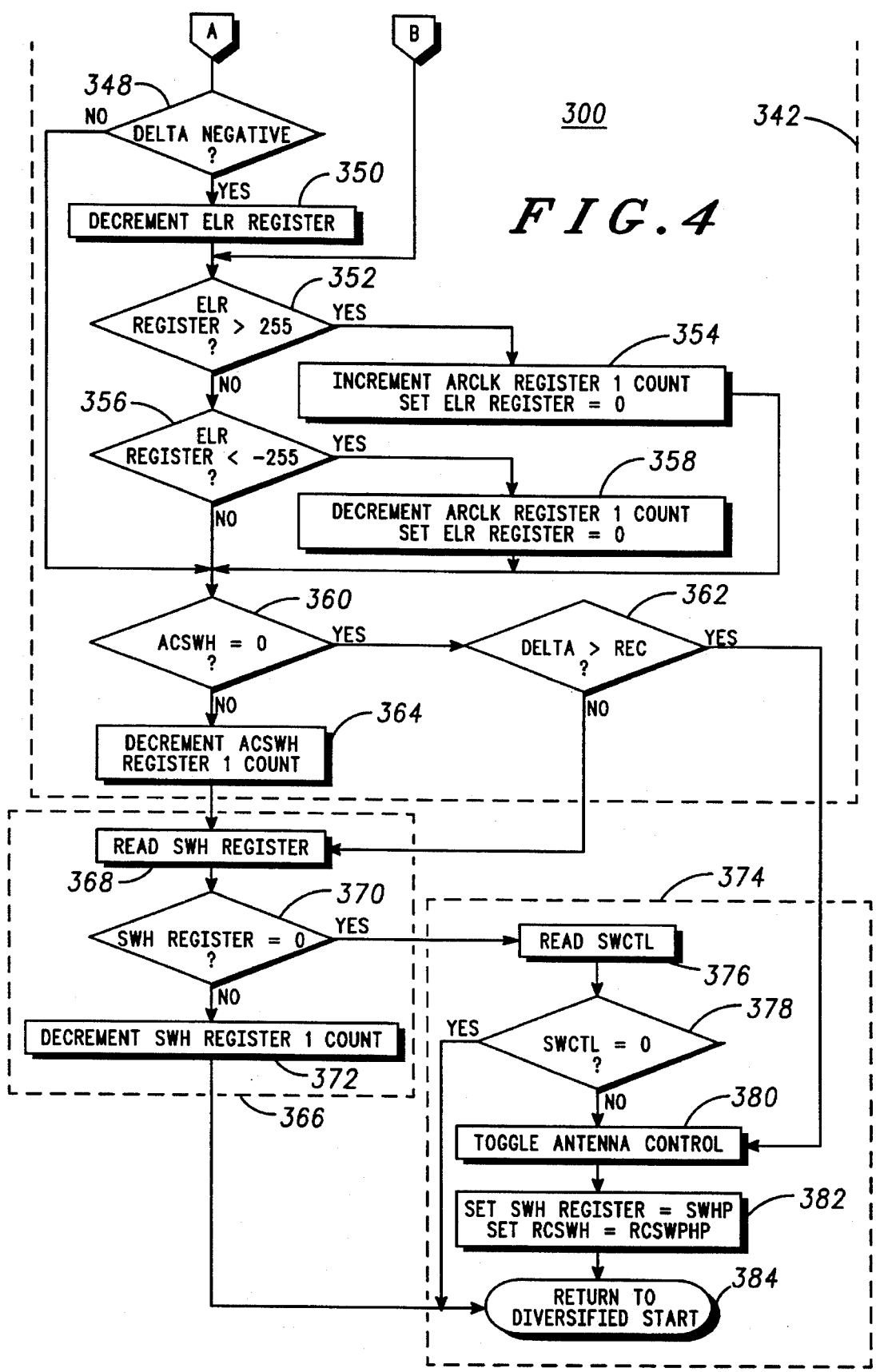
FIG. 4 is a continuation of the flowchart of FIG. 3.

Referring to section 342, in step 340, the recovered clock time is captured and the difference, or delta, between the current recovered clock value and the average recovered clock value is calculated, this delta represents the current delay. In step 344 if the delta is determined to be positive, the recovered clock early/late register is incremented in step 346. A continuation of the flowchart 300 follows in FIG. 4. Step 348 determines if the delta is negative, and if so decrements the ELR register by one count in step 350. The algorithm next accommodates for a handset user moving away from the base, in steps 352 and 356. If 255 occurrences occur in either the positive or negative direction, the ARCLK register is adjusted accordingly. This provides the ability to adjust the diversity algorithm when the delay in the channel change is due to user movement and not delay dispersion. In step 352, if the recovered clock early/late register is determined to be greater than 255, the average recovered clock value is incremented by one count and the ELR register is set to zero in step 354. In step 356, if the ELR register is less than −255, the average recovered clock value is decremented by one count and the ELR register is set to zero in step 358.

The recovered clock hysteresis register is then compared to 0 in step 360 and if the RCSWH is found to be equal to 0, the delta value will then be compared to the recovered clock change threshold register in step 362 to determine if the delay in the channel has exceeded an amount specified by the REC register. If the delta value is greater than the REC value then the REC value in step 362, the antennas will be toggled and the hysteresis registers, SWH and RCSWH, will be reset to their preset values and the diversity algorithm started over again (as will be shown in section 374). If the result of step 360 is not equal to 0, the RCSWH is decremented by 1 count to indicate that the recovered clock hysteresis is not long enough (i.e. had not provided for sufficient number of receive frames). and the code will proceed to check the register for phase error and RSSI hysteresis in the next section 366.

Section 366 determines if the programmable hysteresis value for RSSI slope and phase error has reached 0. If it has not, the SWH register is decremented and the diversity algorithm is started over. If the SWH register has a value of zero then the code will proceed to section 374. The two hysteresis registers, SWH and RCSWH, are responsible for guaranteeing the system will lock to a new antenna for a period of time defined by the hysteresis. This prevents the jumping back between antennas 202 and 204.

Referring now to section 366, The switch hysteresis register for phase error and RSSI is read in step 368. The value of the SWH reading in step 368 is compared to zero at step 370 to determine if the current antenna has been selected for the minimum number of receive frames defined by SWH. If the SWH register does not equal 0 in step 370, then the SWH register gets decremented by 1 count in step 372 and the algorithm is started over again at step 384 without toggling between the two antennas 202, 204. If the SWH register equals zero in step 370, then the switch control line is read at step 376 in the following section 374.

Section 374 determines if the switch control has been set and if it is set will cause the antennas in communication system 200 to toggle and the hysteresis registers, SWH and RCSWH, to reset to their preset values. If SWCTL is not set, then the code will return to the start of the diversity algorithm.

Referring now to section 374, the switch control for phase error and RSSI is read in step 376 and compared to zero in step 378. If the SWCTL is equal to zero this indicates that the diversity algorithm has not detected a parameter that would require a change in antenna selection and the algorithm is started over as indicated by step 384. If SWCTL is not equal to 0, the antennas are toggled as shown in step 380, and the switch hysteresis register for RSSI and phase error is set equal to the value of the switch hysteresis preset register in step 382. The recovered clock switch hysteresis register is also reset to its preset value in step 382. The algorithm is then started over by a return to start diversity at step 384, which directs the algorithm back to step 303. It is not necessary to reinitialize any registers other than SWH and RCSWHP, when restarting the diversity algorithm.

Figure 5:
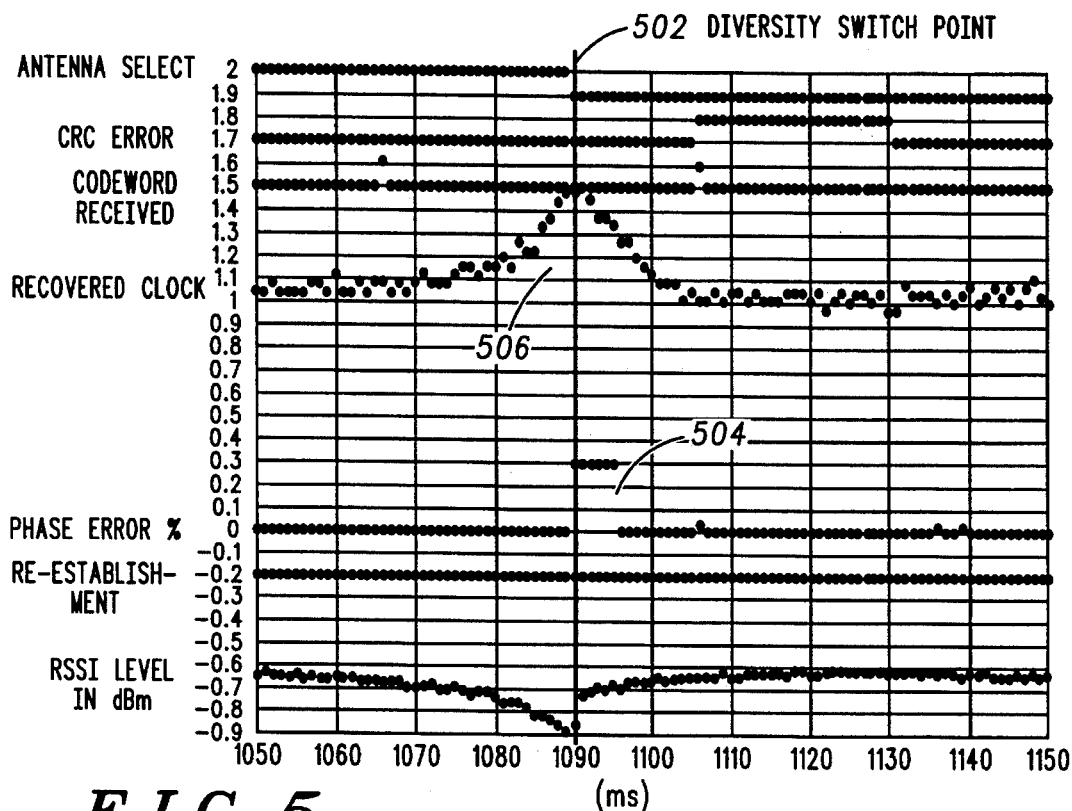
FIG. 5 is a graph of a muting condition resulting from a prior art diversity algorithm.
Figure 6:
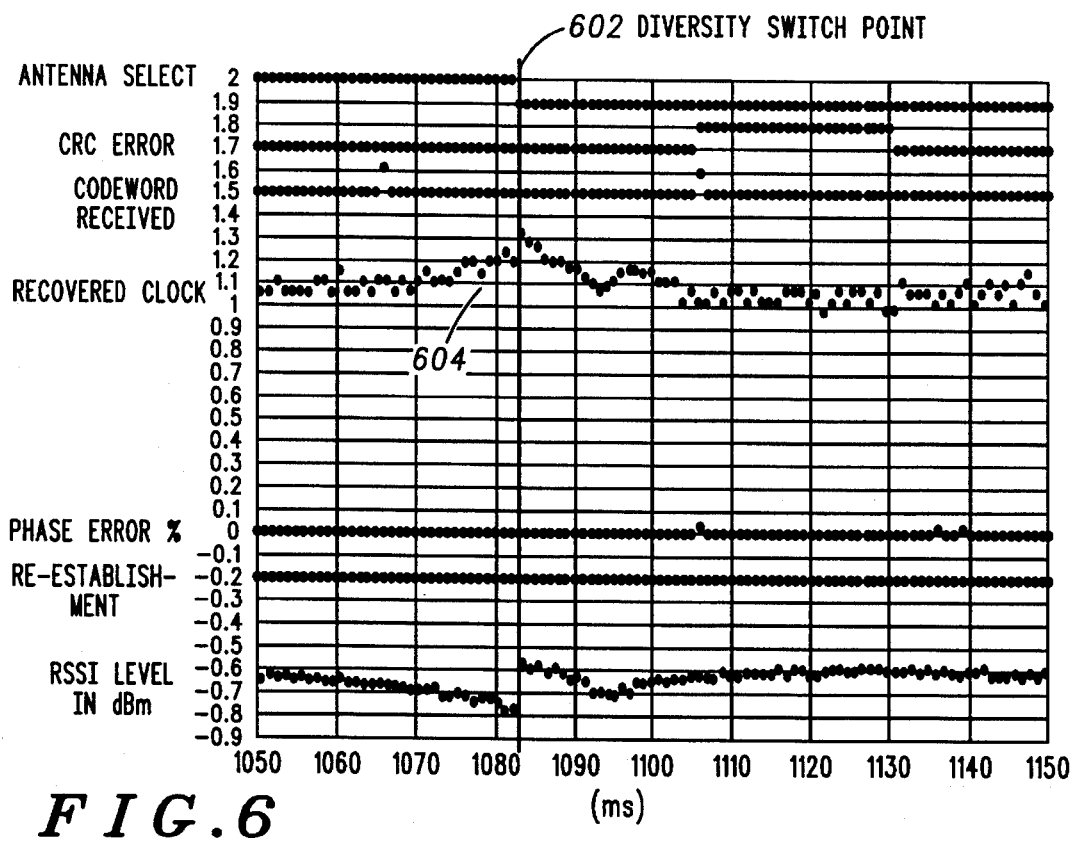
FIG. 6 is a graph of results using the diversity algorithm in accordance with the present invention based on the same data as FIG. 4.
Figure 7:
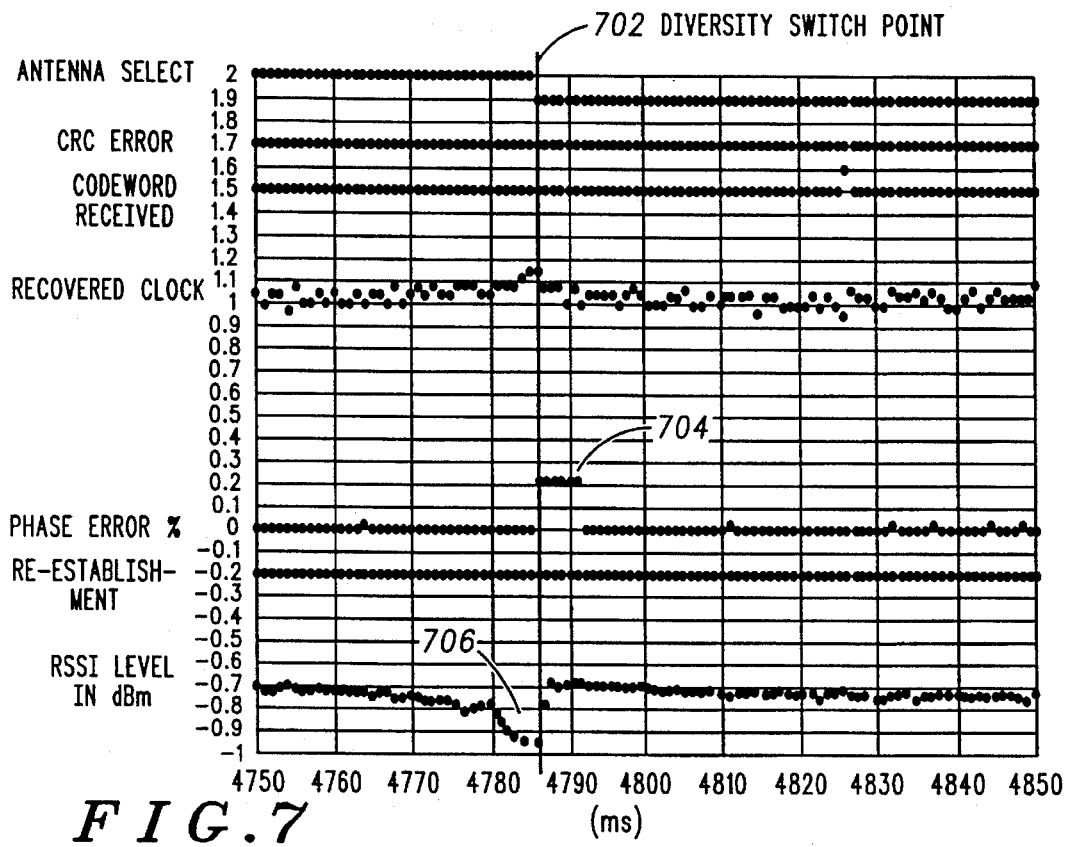
FIG. 7 is a graph of a muting condition resulting from a prior art diversity algorithm.
Figure 8:
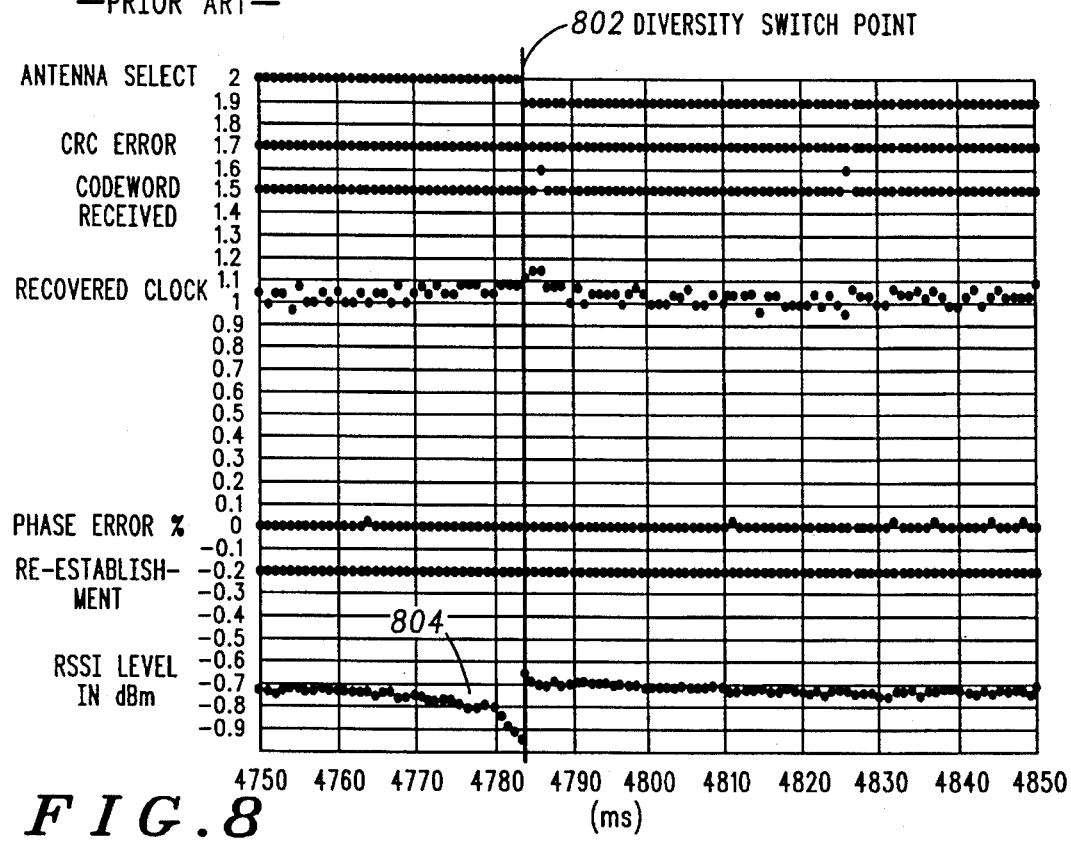
FIG. 8 is a graph of results using the diversity algorithm in accordance with the present invention based on the same data as FIG. 6.
Figure 9:
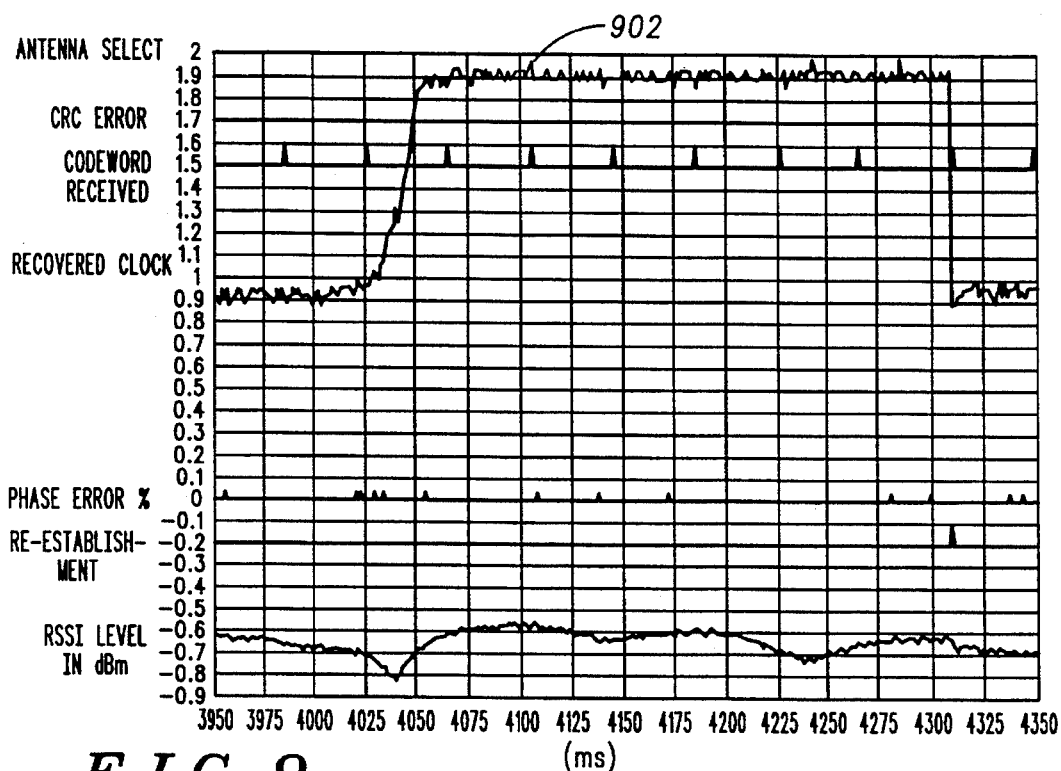
FIG. 9 is a graph of a muting condition resulting from a prior art diversity algorithm.
Figure 10:
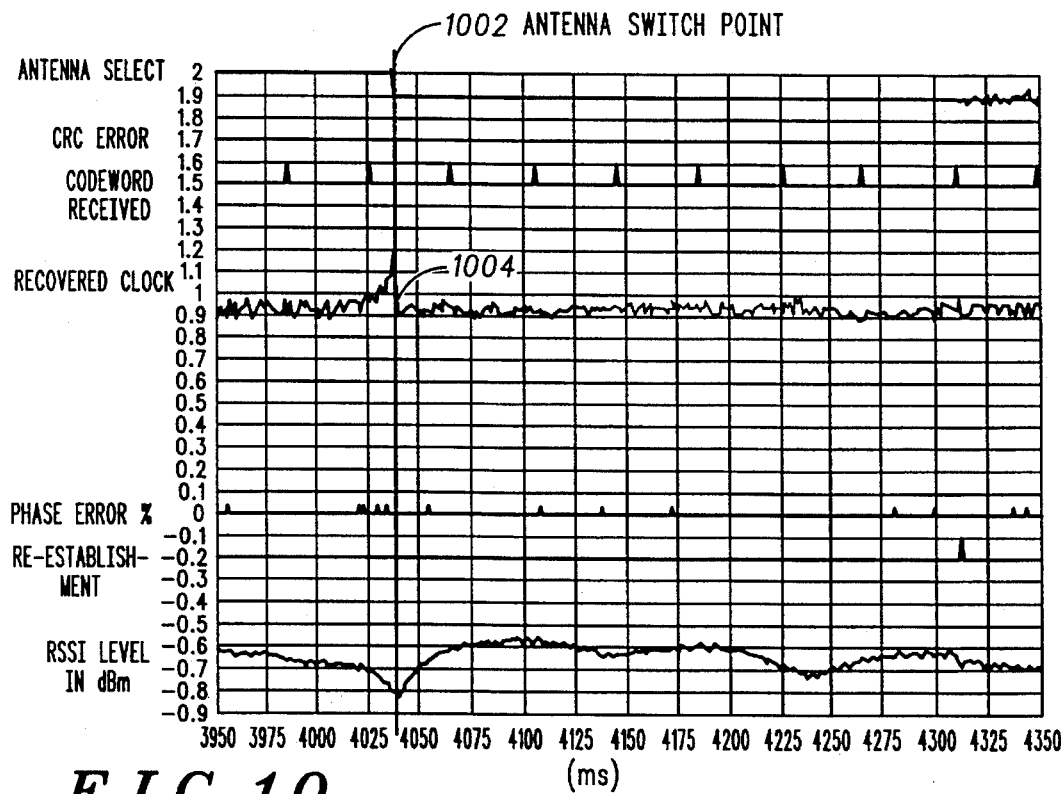
FIG. 10 is a graph of results using the diversity algorithm in accordance with the present invention based on the same data as FIG. 8.

In FIGS. 5, 7, and 9 a prior art algorithm is used to show potential muting problems when only phase error is used as an indication for switching the antenna. Graphs depicted in FIGS. 6, 8, and 10 show examples of potential improvement that can be obtained using the diversity algorithm as described by the invention. Recall that a phase error level exceeding 20% causes a mute in the preferred embodiment of the invention. A phase error of 10% is represented in the graphs of FIGS. 5 through 10 as 0.1.

FIG. 5 of the accompanying drawings depicts a prior art graph showing the antenna switch point 502 using a typical prior art diversity algorithm using phase error detection only. As shown in the graph of FIG. 5, the diversity algorithm does not switch early enough to avoid a phase error level 504 that would create a mute caused by an excessive change in channel delay created by the recovered clock 506.

FIG. 6 depicts an example showing the antenna switch point 602 and expected resulting data when the second antenna is non-correlated using the same data as in FIG. 5 but applying the diversity algorithm as described by the present invention. The algorithm provides a switch indication 14 milliseconds (ms) prior to that shown in FIG. 5. This earlier antenna switching will reduce the likelihood of the phase error level reaching the mute point. In the example of FIG. 6 the switch trigger is the recovered clock 604.

FIG. 7 depicts another example of the prior art diversity algorithm not being able to evaluate the channel quality sufficiently to avoid the mute occurrence 704 caused by the RSSI 706.

In FIG. 8, an example of the diversity algorithm in accordance with the invention shows the antenna switch point 802 and expected resulting data when the second antenna is non-correlated using the same data as that used in FIG. 7 but applying the diversity algorithm as described by the invention. The algorithm provides the switch indication 802 four seconds prior to the antenna switch point 702 shown in FIG. 7. This earlier antenna switching will reduce the likelihood of the phase error level reaching the mute point. In the example shown in FIG. 8 the switch trigger is the RSSI slope 804.

FIG. 9 depicts yet another example an antenna switch point using the prior art diversity algorithm. In this example the clock shifted 1 bit time with no phase error 902. If no other means other than phase error detection is provided to switch antennas, then there is no recovery from this channel degradation and a re-establishment would likely occur.

FIG. 10 depicts an example of the antenna switch point 1002 and resulting data when the second antenna is non-correlated and using the same data as that of FIG. 9 but employing the diversity algorithm as described by the invention. The graph of FIG. 10 shows that the antenna switch point 1002 is triggered by the recovered clock change 1004.

Note that the diversity algorithm as described by the preferred embodiment is not so limited. The algorithm could be altered by varying the initialization values of the registers and variables. Furthermore, the averaging of the recovered clock could be performed over say 100 frames instead of 256 frames in step 308. Although the preferred embodiment shows only two antennas 202, 204, communication device 200 could include more than two. The algorithm could also be set up with individual hysteresis registers for both RSSI and phase error if so desired. Furthermore, the algorithm could be modified for tracking the hysteresis by incrementing the counters and counting upwards until a predetermined number of receive frames has expired rather than decrementing until a predetermined number of receive frames has expired as was done in the preferred embodiment.

Hence, the diversity algorithm as described by the invention provides a means for selecting one of at least two antennas based on the detection of group delay distortion in data systems without the use of imbedded synchronization information. By comparing the parameters of recovered clock, phase error, and RSSI to individual thresholds, any one of the three parameters can trigger an indication to switch antennas when an excursion outside at least one of the threshold windows occurs, thus providing a unique method of antenna selection. The diversity algorithm also guarantees that the system will lock to a new antenna for a period of time as defined by the hysteresis. A communication system using the diversity algorithm as described by the invention provides a reduction in muting and link re-establishments over present switch diversity systems.

What is claimed is:

1. A method for selecting between first and second antennas in a communication device, the communication device currently receiving a signal at the first antenna, the method comprising the steps of:

receiving a signal at the communication device;

measuring characteristics of the received signal including: received signal strength, phase error, and recovered clock of the received signal;

determining signal quality of the received signal based on the measurements;

switching from the first antenna to the second antenna when the received signal strength exceeds a received signal strength threshold and the phase error exceeds a phase error threshold and the recovered clock exceeds a recovered clock threshold.

2. A method for selecting between first and second antennas in a communication device, the communication device currently receiving a signal at the first antenna, the method comprising the steps of:

receiving a signal at the communication device;

measuring characteristics of the received signal including: received signal strength, phase error, and recovered clock of the received signal;

establishing a received signal strength threshold, a phase error threshold, and a recovered clock threshold;

comparing the received signal strength, the phase error and the recovered clock of the received signal with the received signal strength threshold, the phase error threshold, and the recovered clock threshold, respectively; and toggling from the first antenna to the second antenna when at least one of the measured characteristics of the received signal exceeds the received signal strength, phase error, and recovered clock thresholds.

3. A method as described in claim 2, wherein the received signal comprises a plurality of receive frames, the method further comprising the steps of:

establishing a hysteresis threshold;

counting the number of receive frames received at the first antenna and comparing the number to the hysteresis threshold; and maintaining the received signal at the first antenna when the number of counted receive frames does not exceed the hysteresis threshold; and switching from the first antenna to the second antenna when the number of counted receive frames exceeds the hysteresis threshold.

4. A method as described in claim 3, wherein the step of establishing a hysteresis threshold for the number of received frames comprises the steps of:

establishing a recovered clock hysteresis threshold when the difference between the recovered clock and an average recovered clock value exceeds the recovered clock threshold; and establishing a received signal strength and phase error hysteresis threshold when one of the received signal strength exceeds the received signal strength threshold and the phase error exceeds the phase error threshold.

5. A method as described in claim 4, wherein the step of maintaining the received signal at the first antenna comprises the step of maintaining the received signal at the first antenna when the number of receive frames does not exceed the recovered clock hysteresis threshold.

6. A method as described in claim 5, wherein the step of switching from the first antenna to the second antenna comprises the step of switching to the second antenna when the number of counted receive frames exceeds the recovered clock hysteresis threshold.

7. A method as described in claim 4, wherein the step of maintaining the received signal at the first antenna comprises the step of maintaining the received signal at the first antenna when the number of receive frames does not exceed the received signal strength and phase error hysteresis threshold.

8. A method as described in claim 7, wherein the step of switching from the first antenna to the second antenna comprises the step of switching to the second antenna when the number of counted receive frames exceeds the received signal strength and phase error hysteresis threshold.

9. A method as described in claim 4, wherein the communication device includes a digital phase lock loop circuit, and the step establishing a recovered clock hysteresis threshold comprises the step of setting the hysteresis threshold based on the bandwidth of the digital phase lock loop circuit.

10. A method as described in claim 2, wherein the step of measuring the recovered clock further comprises the step of generating a delay value based on the recovered clock and comparing it to said recovered clock threshold.

11. A method as described in claim 10, wherein the step of generating the delay value comprises the step of;

determining a current recovered clock value based on the received signal;

determining an average recovered clock value based on the received signal; and subtracting the average recovered clock value from the current recovered clock value thereby generating the delay value.

12. A method for switching between two antennas in a communication unit, the communication unit receiving a signal at a currently selected antenna, and the signal being characterized by receive signal strength, phase error, and recovered clock, the signal also being received in a plurality of receive frames, the method comprising the steps of:

loading a first, second and third register with a receive signal strength threshold, a phase error threshold, and a recovered clock threshold, respectively;

comparing the signal being characterized by receive signal strength, phase error, and recovered clock to the first three registers, respectively;

determining which of the thresholds has been exceeded;

loading a fourth register with a recovered clock hysteresis limit;

loading a fifth register with a receive signal strength and phase error hysteresis limit;

counting the number of receive frames for recovered clock;

comparing the number of receive frames for recovered clock to the fourth register;

determining if the number of receive frames for recovered clock exceeds the recovered clock hysteresis limit;

counting the number of receive frames for phase error and receive signal strength;

comparing the number of receive frames for phase error and receive signal strength to the fifth register;

determining if the number of receive frames for phase error and receive signal strength exceeds the phase error and receive signal strength hysteresis limit;

switching from the currently selected antenna when both the recovered clock threshold has been exceeded and the recovered clock hysteresis limit has been exceeded; and switching from the currently selected antenna when both the phase error and receive signal strength threshold has been exceeded and the phase error and receive signal strength hysteresis limit has been exceeded.

13. A method as described in claim 12, further comprising the step maintaining the currently selected antenna when none of the recovered clock, phase error and receive signal thresholds have been exceeded.

14. A method for changing from a current antenna selection to a subsequent antenna in a communication unit that is receiving a signal at the current antenna, the method comprising the steps of:

measuring receive signal strength, phase error, and recovered clock of the signal at the current antenna;

determining limits for received signal strength, phase error, and recovered clock;

determining if each of the receive signal strength, the phase error, and the recovered clock exceeds its respective limit;

toggling to the subsequent antenna when each of the receive signal strength, the phase error, and the recovered clock exceeds its respective limit; and maintaining the current antenna selection when all of the receive signal strength, the phase error, and the recovered clock do not exceed their respective limits.

15. A method for changing from a current antenna selection to a subsequent antenna in a communication unit that is receiving a signal at the current antenna, the communication unit receiving the signal for a receive period comprising a plurality of receive frames, the method comprising the steps of:

measuring receive signal strength, phase error, and recovered clock of the signal at the current antenna;

determining limits for received signal strength, phase error, and recovered clock;

determining if at least one of receive signal strength, phase error, and recovered clock exceeds its limit;

setting a threshold for the number of receive frames received during the receive period;

monitoring the number of receive frames throughout the receive period;

comparing the number of receive frames to the threshold;

toggling to the subsequent antenna when at least one of receive signal strength, phase error, and recovered clock exceeds its limit; and maintaining the current antenna selection when all of the receive signal strength, phase error, and recovered clock do not exceed their respective limits.

16. A method as described in claim 15, further comprising the steps of:

maintaining the current antenna selection when the number of counted receive frames does not exceed the threshold; and toggling to the subsequent antenna when the number of counted receive frames exceeds the threshold.

17. An apparatus for selecting one of at least two antennas in a communication device comprising a currently selected antenna and providing a means for determining received signal quality and for toggling from the currently selected antenna to a subsequent antenna based on the received signal quality, the apparatus comprising:

a receiver for receiving a signal from the currently selected antenna;

a switch for electrically coupling the currently selected antenna to the receiver;

a phase lock loop circuit coupled to the receiver for providing a receive signal strength indicator signal, a phase error signal, and a recovered clock signal; and a controller coupled to the receiver for determining the received signal quality of the signal based on the receive signal strength indicator signal, the phase error signal, and the recovered clock signal, and providing a control signal when the receive signal strength indicator signal exceeds a receive signal strength threshold and the phase error signal exceeds a phase error signal threshold and the recovered clock signal exceeds a recovered clock threshold, the switch being operatively responsive to the control signal for toggling from the currently selected antenna to the subsequent antenna.

18. An apparatus as defined in claim 17, wherein the apparatus comprises a second generation cordless telephone (CT2) base station.

* * * * *